UNITED STATES PATENT OFFICE.

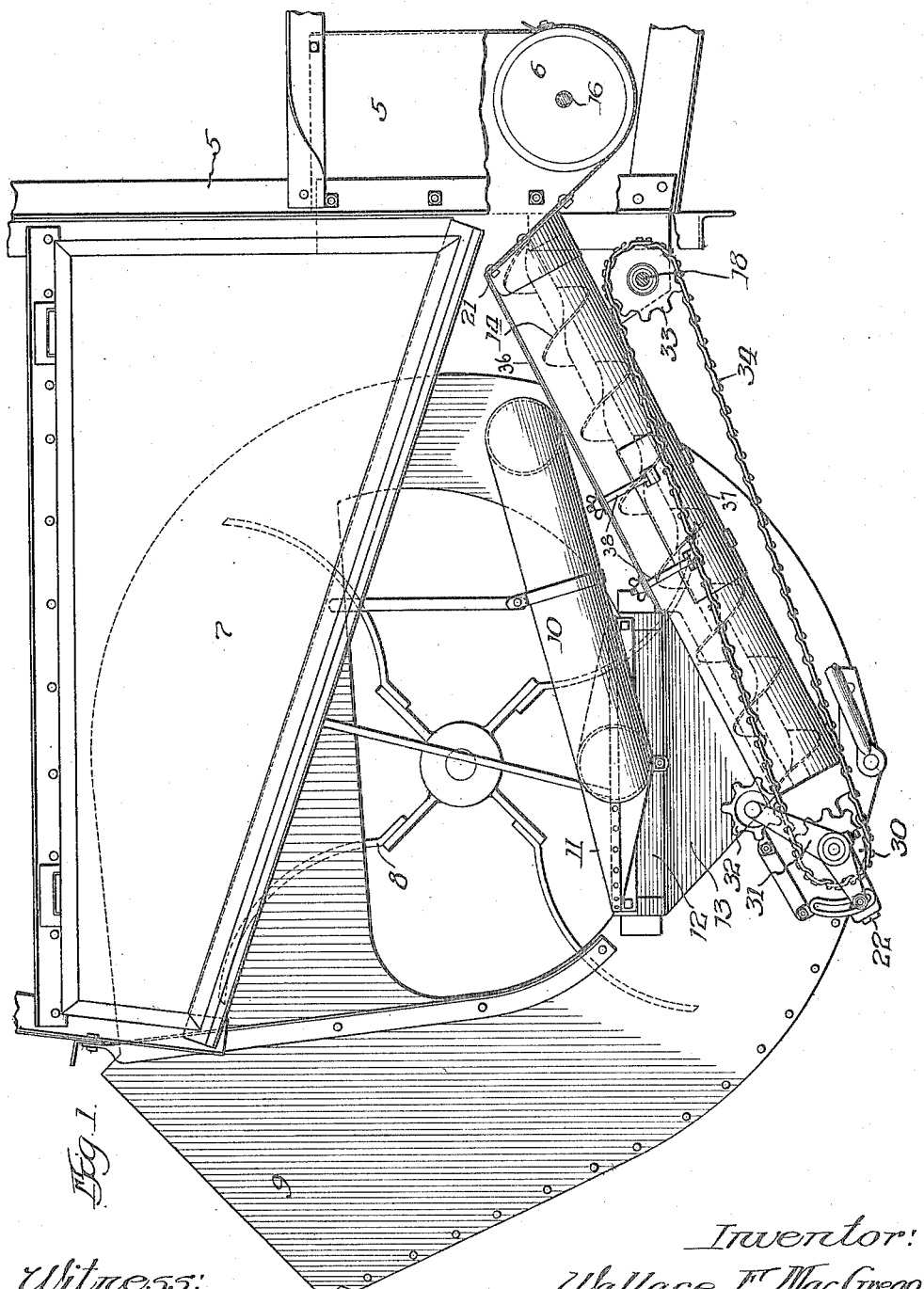

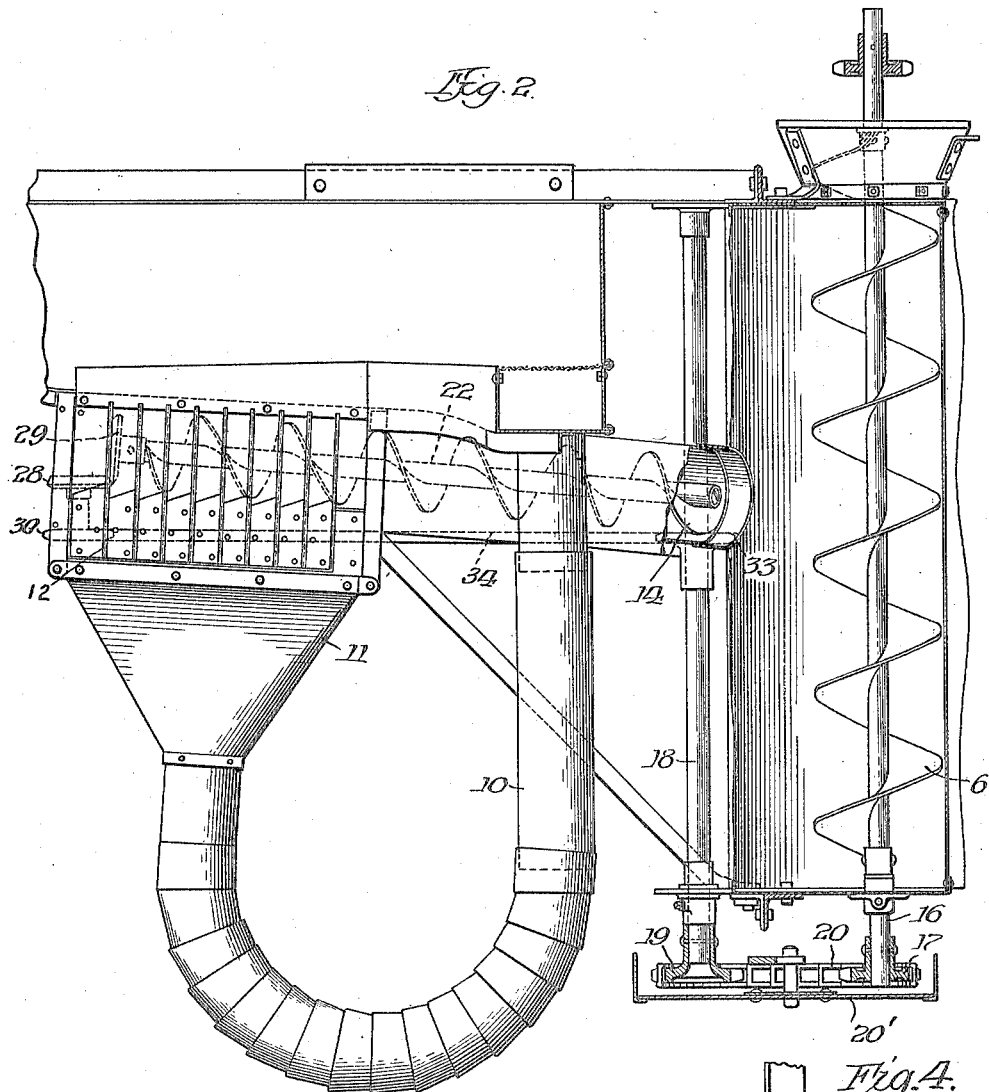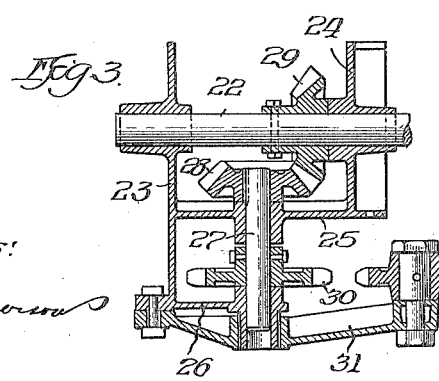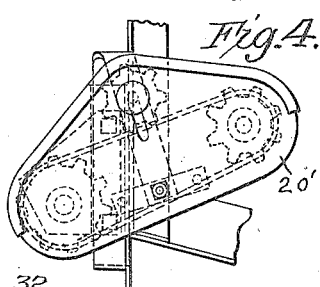

WALLACE F. MacGREGOR, OF RACINE, WISCONSIN, ASSIGNOR TO THE INDIANA MANUFACTURING COMPANY, OF INDIANAPOLIS, INDIANA, A CORPORATION OF WEST VIRGINIA.

PNEUMATIC STRAW-STACKER.

1,273,255.  Specification of Letters Patent.  Patented July 23, 1918.

Application filed February 15, 1918. Serial No. 217,373.

*To all whom it may concern:*

Be it known that I, WALLACE F. MACGREGOR, a citizen of the United States, residing at Racine, in the county of Racine and State of Wisconsin, have invented certain new and useful Improvements in Pneumatic Straw-Stackers, of which the following is a specification.

My present invention relates to pneumatic straw stackers for threshing machines, and particularly to that type known as grain saving wind stackers, which are designed to trap and save grain discharging from the rear end of the threshing machine with straw and other material, and preventing the waste of such grain in the straw stack, said invention being directed to actuate the operating parts of the stacker in a simple and convenient manner.

In the accompanying drawing, forming a part hereof, Figure 1 is a side elevation of a grain saving wind stacker as attached to a threshing machine, a fragment of the latter being illustrated in connection therewith; Fig. 2 a plan of certain portions of said stacker with my improved driving mechanism associated therewith; Fig. 3 is a detail of a part of said driving mechanism, and Fig. 4 is a view of the sprocket shield which I employ.

In said drawings the numeral, 5, indicates a portion of a threshing machine; 6, the usual tailings auger forming a part thereof; 7, the straw chamber of the stacker; 8, the fan thereof; 9, the boot or ejecting chute; 10, the auxiliary blast pipe; 11, the nozzle thereof; 12, the grain trap; 13, the hopper leading therefrom to the auger, 14, for conveying saved grain to the tailings auger 6 of the thresher. These parts are common and well known as components of the grain saving stacker and will only be referred to incidentally in describing my invention.

In handling large masses of material constantly discharging from the rear end of threshing and like separating machines during operation, it is essential that the stacker fan must run at a very high rate of speed, being driven from the cylinder shaft at the forward end of the machine. It has been the practice to drive the auger 14 from the stacker fan by a system of sprocket or belt gearing, communicating with a countershaft at the rear of boot 9 and with the gearing at the lower end of said auger, necessitating such an arrangement and graduation of sizes of the driving and driven parts as to insure the operation of said auger at very low speed. This arrangement, however, has been found objectionable and not entirely practical because of the displacement of some of the parts consequent upon the high speed of the stacker fan, extreme noise when in operation, and liability to accident by operators whose duty requires attendance, more or less, at that end of the machinery, and for the further and more important reason that when the wind stacker becomes choked, which happens occasionally, the driving mechanism of the auger 14 continues in operation, thus propelling material into and overloading the tailings auger 6 of the threshing machine and thereby adding to the clogged condition of the entire threshing machinery generally.

In order to obviate the objection and difficulties referred to, and to improve and render more efficient the grain saving wind stacker, particularly as to the operation of the auger 14, I utilize the power from the tailings auger 6 of the stacker for actuating said auger 14. This is accomplished by mounting on the shaft, 16, of auger 6, a sprocket, 17, and providing at the rear of said auger, a countershaft, 18, which is supported in any suitable manner by the frame work of the thresher or stacker. Upon said countershaft 18, a sprocket, 19, is mounted, which is in alinement with the sprocket, 17, and each of said sprocket wheels is connected by a chain, 20. These sprockets are preferably protected by a shield, 20'. The auger 14 is preferably arranged in an inclined position adjacent the stacker fan and communicating with the tailings auger 6 through its housing 21 to propel and deliver material from hopper 13 into said tailings auger. The lower end of shaft, 22, of said auger 14 is supported in a boxing (Fig. 3) comprising the walls, 23, 24, constituting a double bearing therefor, said boxing also including the lateral walls, 25, 26, which support driving shaft, 27, upon which shaft is mounted a gear, 28, which meshes with gear, 29, on said shaft 22. The outer end of said shaft 27 is provided with a sprocket wheel, 30, and projecting from said wall 26 is an arm, 31, carrying a tightener, 32, said sprocket wheel 30 and tightener 32 being in alinement with sproket, 33, on shaft 18, and with which elements a sprocket chain, 34, is connected as indicated in Fig. 1. It will be noted (Fig. 2) that for compactness of arrangement sprockets 30, 33, and chain 34 are positioned adjacent the auger 14, and these mechanisms together with said auger, being beneath the stacker hopper (not shown) are protected from injury and away from contact of the operators about the machinery.

The tailings auger 6 is run at comparatively low speed, and it is desirable that the auger 14 also shall run at approximately the same speed, so that an over supply of material will not be discharged into said auger 6, which has the double duty of conveying such materail and also the tailings which are delivered at that point from the threshing machine. Therefore, shafts 16 and 18 are caused to revolve at practically the same speed, shaft 16, of course, being driven from any suitable source on the thresher, in turn actuating shaft 18, which, through sprocket arrangement 30, 33, and 34, operate auger 14 to convey material discharging through hopper 13 to said tailings auger. By this arrangement, the auger 14 operates simultaneously with auger 6, which insures that should there be a cessation of the threshing machine, or parts thereof, said auger accordingly ceases to run, and consequently auger 14, so that overloading of auger 6 is prevented, or, should the wind stacker become choked, this occurrence has no effect upon auger 14, which, as will be understood, is actuated independently of the stacker driving mechanisms, and is subjected only to the driving influence of auger 6. In casing, 36, for auger 14 (Fig. 1) I provide a trap-door, 37, which may be held in closed position by suitable catches, such as 38, which door may be opened to inspect and determine the amount of material being conveyed by said auger.

I claim as my invention:

1. The combination, with a pneumatic stacker, of a tailings auger, a countershaft in parallel relation thereto, driving means connecting said auger and shaft, a grain saving conveyer communicating with said tailings auger, actuating mechanisms at one end of said conveyer, a driving wheel on said countershaft, and means connecting said wheel and said actuating mechanisms for operating said conveyer to deliver material into said tailings auger.

2. The combination, with a pneumatic stacker, of a tailings auger, a countershaft in parallel relation thereto, driving means connecting said auger and shaft, a conveyer communicating with said auger, a gear boxing in which one end of said conveyer is mounted, driving gear therein, a sprocket on said countershaft, and a chain communicating with said sprocket and said driving gear whereby said conveyer is actuated from said gear.

3. The combination, with a pneumatic stacker comprising a fan, an auxiliary blast pipe, a grain trap adjacent said fan, and a hopper leading from said trap, of an auger conveyer communicating with said hopper, a gear boxing in which said conveyer is supported, driving gear in said boxing communicating with said conveyer, a tailings auger with which said conveyer communicates, a sprocket at the end of said auger, a countershaft arranged in parallel relation to said auger, a sprocket at the end thereof, a chain connecting said sprockets, a sprocket on said countershaft distant from its end and in alinement with said conveyer gearing, and means connecting said latter elements for actuating said conveyer from said auger.

4. In combination, a separator and a pneumatic stacker, said separator embodying means for conveying tailings, a countershaft in parallel relation to said conveying means, actuating means communicating with said conveyer and said countershaft, a grain saving conveyer communicating with said tailings conveyer, driving mechanism associated with said grain saving conveyer, and means communicating with said countershaft and said grain saving conveyer for actuating the latter to deliver material into said tailings elevator.

5. In combination, a separator and a pneumatic stacker, said separator embodying means for conveying tailings, a countershaft in parallel relation to said conveying means, actuating means communicating with said conveyer and said countershaft, a grain saving conveyer communcating with said tailings conveyer and having a door therein for the inspection of material, driving mechanism associated with said grain saving conveyer, and means communicating with said countershaft and said grain saving conveyer for actuating the latter to deliver material into said tailings elevator.

In testimony whereof I affix my signature in the presence of two witnesses.

WALLACE F. MacGREGOR.

Witnesses:
 E. M. JOHNSON,
 C. M. SAUNSON.